G. V. TWISS.
SUPPORTING LENGTHS OF WIRE.
APPLICATION FILED OCT. 24, 1916.
1,234,583.
Patented July 24, 1917.
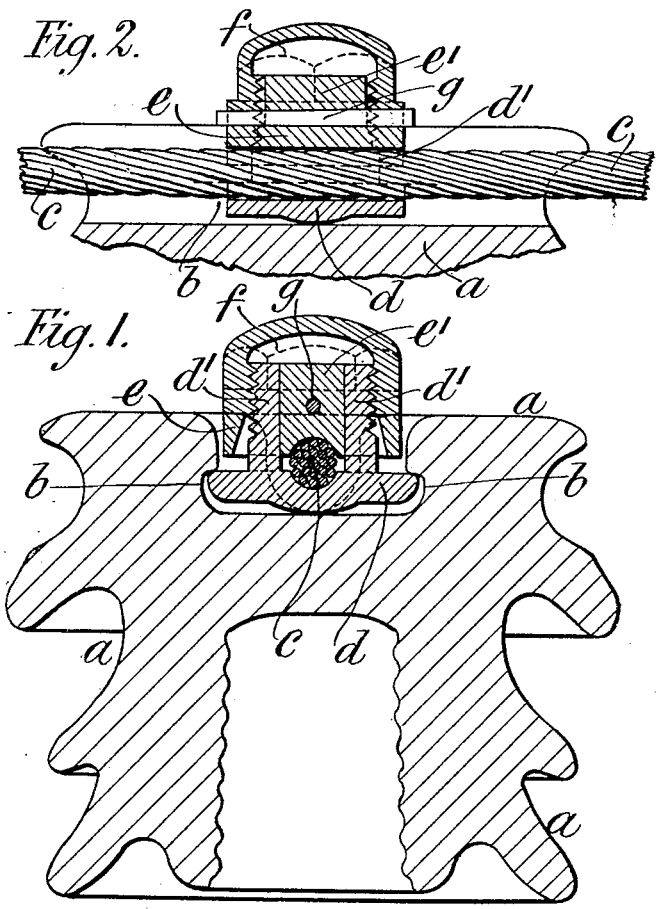
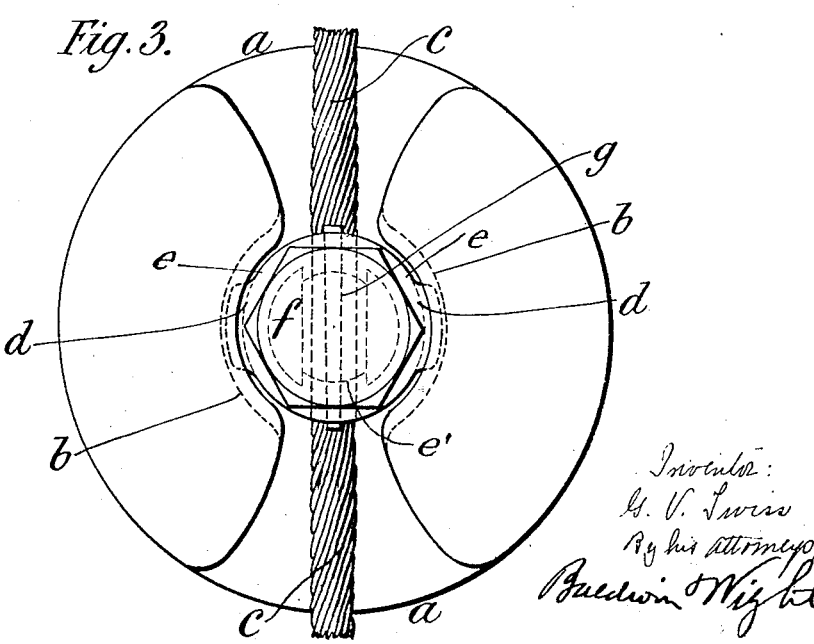

UNITED STATES PATENT OFFICE.

GEORGE V. TWISS, OF LONDON, ENGLAND, ASSIGNOR OF ONE-HALF TO BULLERS, LIMITED, OF LONDON, ENGLAND.

SUPPORTING LENGTHS OF WIRE.

1,234,583.　　　　　Specification of Letters Patent.　　Patented July 24, 1917.

Application filed October 24, 1916. Serial No. 127,408.

*To all whom it may concern:*

Be it known that I, GEORGE VICTOR TWISS, a subject of the King of Great Britain, residing at 6 Laurence Pountney Hill, in the city of London, England, have invented new and useful Improvements in Supporting Lengths of Wire, of which the following is a specification.

This invention relates to means for supporting lengths of wire which term is used broadly to include conductors, cables and the like.

According to this invention to support lengths of wire a support is formed with a passage and segmental undercut recesses on opposite faces of the passage, the wire being retained by a clamp one element of which is provided with flanges adapted to engage in the segmental recesses.

The invention is particularly applicable for attaching conductors to line insulators and for carrying an earthed wire.

Preferably a clamp is composed of three elements, a flanged element provided with screw threaded segments, an intermediate element consisting of a base plate having holes into which the threaded segments pass and a central projection adapted to fit between the threaded segments and a nut.

The invention is illustrated in the accompanying drawings, in which Figures 1 and 2 are sections taken at right angles to each other and Fig. 3 is a plan of a line insulator with its clamp and conductor.

In the drawings $a$ is the insulator provided at the top with a passage. $b$ are segmental undercut recesses and $c$ the conductor passing through the passage. $d$ is the flanged clamp element and $d^1$ its screw threaded segments. $e$ is the base of the intermediate element and $e^1$ its central projection. $f$ is the nut.

$g$ is a cotter pin which passes through two of a series of holes in the nut and a hole in the projection $e^1$ to prevent movement of the nut when screwed up.

It is obvious that a length of wire or the like can be supported in a like manner.

What I claim is:—

1. Means for supporting a length of wire which consist in the combination with a support formed with a passage for the wire and with a segmental recess on each side of the passage, of clamp elements between which the wire is clamped, one of said elements being provided with flanges adapted to engage in the recesses.

2. Means for supporting a length of wire which consist in the combination with a support formed with a passage and with a segmental undercut recess on each side, of a clamp comprising a flanged element provided with screw threaded segments, an intermediate element comprising a base plate having a central projection adapted to pass between the said screw threaded segments and a nut.

GEO. V. TWISS.

Copies of this patent may be obtained for five cents each, by addressing the "Commissioner of Patents, Washington, D. C."